(No Model.)  2 Sheets—Sheet 1.
T. SOURBÉ.
SPECIFIC GRAVITY APPARATUS.
No. 268,049. Patented Nov. 28, 1882.
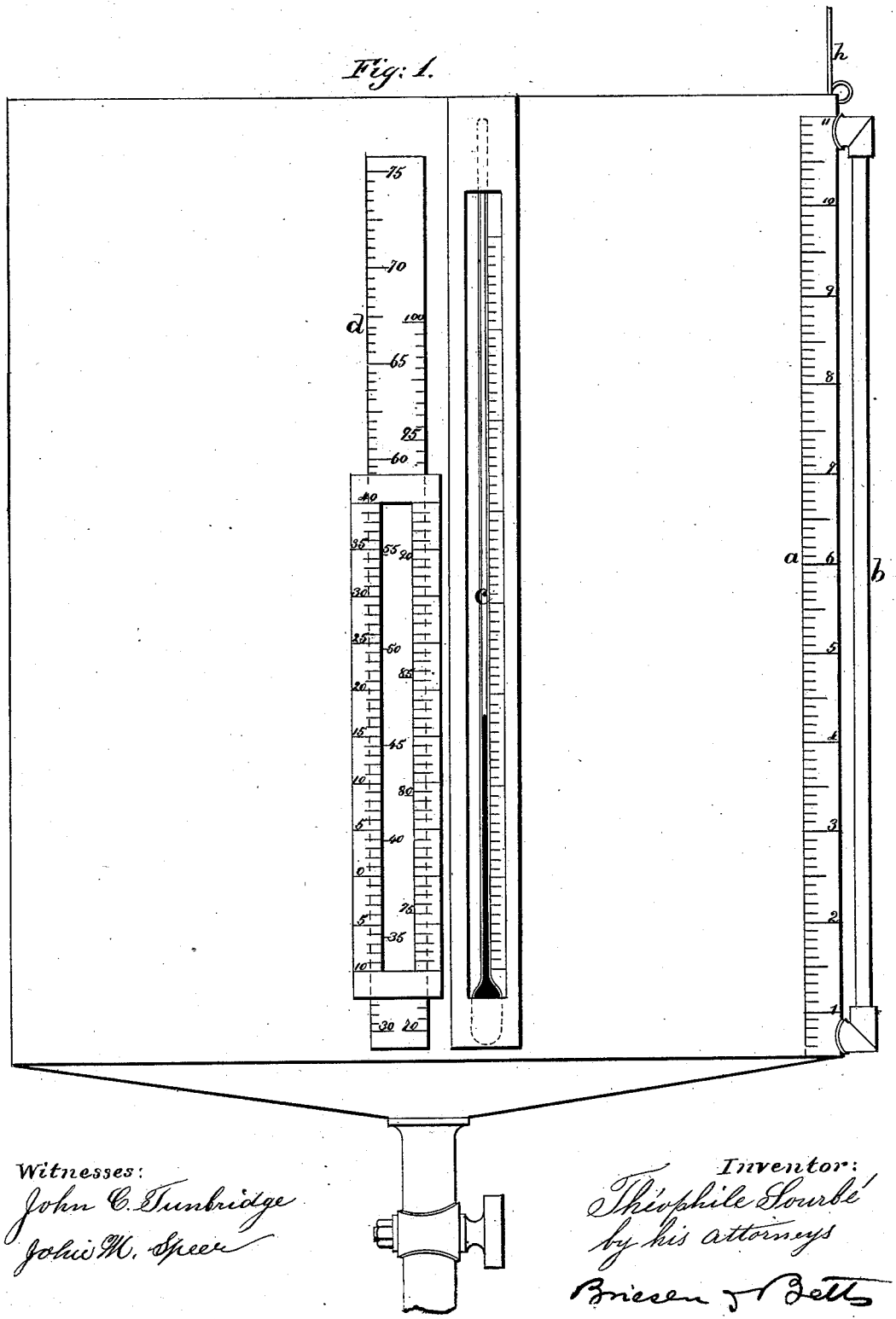
Fig: 1.
Witnesses:
John C. Tunbridge
John M. Speer
Inventor:
Théophile Sourbé
by his attorneys
Briesen & Betts

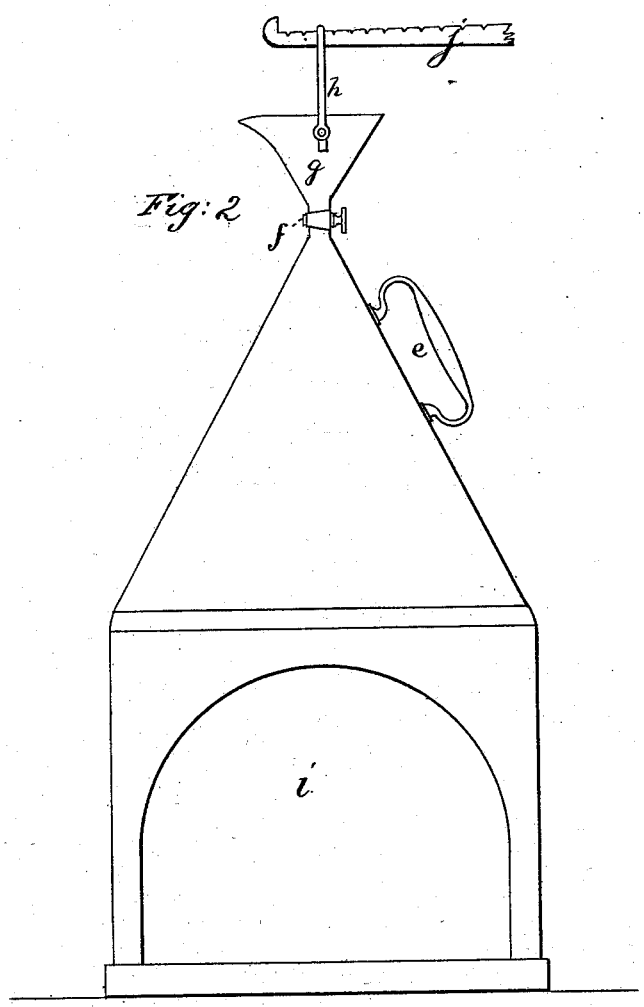

UNITED STATES PATENT OFFICE.

THÉOPHILE SOURBÉ, OF BORDEAUX, FRANCE.

SPECIFIC-GRAVITY APPARATUS.

SPECIFICATION forming part of Letters Patent No. 268,049, dated November 28, 1882.

Application filed June 22, 1881. (No model.) Patented in France February 1, 1881, No. 140,817; in Belgium April 12, 1881, No. 54,370; in England April 14, 1881, No. 1,654; in Germany April 27, 1881, No. 17,123; in Italy June 30, 1881, XXVI, 11; in Austria-Hungary July 9, 1881, No. 13,281, and in Spain July 19, 1881, No. 1,535.

*To all whom it may concern:*

Be it known that I, THÉOPHILE SOURBÉ, of Bordeaux, France, have invented an improved apparatus for ascertaining the capacity of casks and other vessels, the alcoholic strength of spirits, and the weight, volume, and density of liquids generally, (for which I have received French patent for fifteen years, dated February 1, 1881; also English Patent No. 1,654, of April 14, 1881, for fourteen years;) and I do hereby declare that the following is a full, clear, and exact description of the same, reference being had to the annexed sheet of drawings, making a part of the same.

This invention relates to apparatus for ascertaining with accuracy, first, the capacity of casks or other receptacles; second, the alcoholic strength of brandies and other spirits without the use of an alcoholmeter; and, third, the weight, volume, and density of liquids generally.

The apparatus of this invention is intended to supersede the use of densimeters, volumeters, alcoholmeters, and other like instruments, which are liable to error.

With this apparatus the causes of error are considerably reduced, and it is therefore possible to determine with a much greater degree of precision the density and volume of liquids in general, and also the apparent or indicated and real strength of spirituous liquors.

The apparatus of this invention is denominated a "densivolumetric balance," (which name it derives from those of the instruments it is intended to supersede—viz., the balance, the densimeter, and the volumeter;) and it consists of a suitable balance-scale—one on the principle of the steelyard, for example, but modified according to this invention by the substitution for the ordinary slider or counterpoise of a vessel, so as to permit the employment, in lieu of weights, of a liquid of the same kind as that of which it is desired to determine the volume, density, &c. By this substitution, which is the fundamental feature of the invention, great accuracy is obtainable, for if the balance be proportioned accordingly one liter of liquid contained in the said vessel will equipoise one hundred liters of the same liquid placed on the scale pan or platform upon the other arm of the balance, and as both liquids have the same density and temperature, the error, if any, can only be due to the weighing-instrument itself, and not to the balance-weights employed. In order, therefore, to ascertain the exact volume of the liquid placed on the scale pan or platform, it is only necessary to know that of the one-hundredth part of the same liquid which balances it. The determination of this small volume can give rise to but very insignificant errors, which, even when multiplied a hundred fold for the liquid on the platform or scale-pan, would still be inappreciable.

I will now describe the vessels to be employed by preference in carrying out the invention.

The vessel which I will describe first is denominated a "densivolumeter," and is represented in Figure 1 of the accompanying drawings. It is open at top when used for liquids which do not rapidly evaporate; but when used for volatile liquids or spirits it should be provided with a removable or fixed cover and furnished with a funnel and cock. The vessel may be of cylindrical, square, oval, or other form, according to requirements, and according to the kind of weighing-instrument with which it is to be used, and of a capacity proportional to the weighing-instrument. The round form is, however, preferable, being stronger, more easily graduated, more readily cleansed, and cheaper to make of copper or tin plate. This vessel or densivolumeter, which is made of a metal not acted on by the liquid to be tested, is suspended by a bail at the end of the scale-beam of any ordinary scale, and the bottom of the vessel is made conical to facilitate the rapid discharge of the whole of its contents, and is provided with a draw-off cock. Any kind of vessel, with or without a discharge-cock suspended from the scale-beam, would answer the purpose of a densivolumeter, the invention including the employment of any vessel suspended as and for the purpose specified.

The vessel represented in Fig. 1 of the drawings, with all its appurtenances, is intended for use in the complicated operation of alcoholometry; but although all of the latter are not indispensable, even for this purpose, they are very convenient. The vessel is provided with a graduated scale, a, and gage-glass b, extending nearly the whole height of the vessel, and the latter communicating at top and bottom with the interior of the vessel, whereby the level and volume of liquid contained may be read off. The densivolumeter, when intended to be applied to weighing-machines so proportioned that a counter-weight of one pound will equipoise one hundred pounds on the scale-pan, as is preferable, should be of a capacity one hundred times less than that of the largest vessels containing the liquid whose volume or density (or both) is to be ascertained, and which vessels are rolled onto the platform of the weighing-machine for the purpose. The vessel is also provided with a thermometer, c, and a movable scale, d, for correcting the indications and giving at one side the apparent or indicated alcoholic strength and at the other the real strength at the normal or standard temperature, (15° centigrade.) The scale d is graduated at either side of the opening, and is similar to that usually supplied by instrument-makers for the use of dealers in alcohol, and it enables one to dispense with Gay-Lussac's correction-tables used with the centigrade alcoholmeter.

Another vessel to be also used is represented in Fig. 2, and consists of a liter or other measure, which should also be made of a metal suited to the liquids under observation, preferably copper, if the liquids are non-corrosive. This vessel has a handle, e, a neck closed by a stopcock, f, and a funnel-mouth, g. Any other form of measure may, however, be employed, although that shown is preferred, inasmuch as, the neck being small and provided with a cock, a liter of liquid can be quickly measured without liability of error. The funnel also facilitates the filling of the measure with liquid, and having a lip its contents may be readily poured into another vessel. It further serves to hold the liquid which may rise up from the measure by expansion when the cock is left open. When the measure is employed for the purpose of a densivolumeter the funnel receives weights or water for taring the balance if the counter-weight is insufficient. The vessel has a bail, h, for attachment to the end of the scale-beam j, in lieu of the densivolumeter, in certain operations. The measure may be placed on a stand, i, over a small lamp, a gas-flame, or other heater for heating the measure and its contents when desired.

The apparatus is capable of many applications, among which may be mentioned its use for the determination of the capacity of a vat or other receptacle at different portions of its height, and its graduation or division into superposed layers of equal volume for determining with water the capacity of casks intended to contain valuable liquids, (and thus avoid the evaporation of such liquids during the operations of weighing and measuring,) by weighing the full cask against a portion of the same water at the same temperature, and ascertaining the volume of the latter, which balances it, as herein described, for determining, in the case of a cask of brandy, first, its capacity; second, the weight of liquid which exactly fills it; third, the density of this liquid; fourth, its apparent or indicated strength; fifth, its real strength; sixth, the real volume of the liquid at the normal or standard temperature—15° centigrade, for instance.

Having described the nature of the said invention and the manner of performing the same, I declare that what I claim as the invention to be protected by the hereinbefore-in-part-recited Letters Patent is—

1. In combination with the lever j of a balance, the vessel adapted to be suspended therefrom, said vessel having the fixed scale a, gage b, movable scale d, and thermometer c, all arranged to constitute a densivolumetric balance, substantially as herein shown and described.

2. The weighing-scale having lever j, in combination with the liquid-measure placed on said lever and used as a counterpoise in said scale, substantially in the manner and for the purposes specified.

THÉOPHILE SOURBÉ.

Witnesses:
ROBT. M. HOOPER,
JEAN BAPTISTE ROLLAND.